(12) United States Patent
Erickson

(10) Patent No.: US 6,418,867 B1
(45) Date of Patent: Jul. 16, 2002

(54) BIRDSEED MIXTURE AND METHOD FOR PROPAGATING NATIVE WILD FLOWERS

(76) Inventor: Scott W. Erickson, 353 N. Maple Rd., Burlington, WI (US) 53105

( * ) Notice: Subject to any disclaimer, the term of this patent is extended or adjusted under 35 U.S.C. 154(b) by 0 days.

(21) Appl. No.: 09/138,857

(22) Filed: Aug. 24, 1998

Related U.S. Application Data

(63) Continuation-in-part of application No. 08/791,822, filed on Jan. 30, 1997, now abandoned.

(51) Int. Cl.$^7$ .................................................. A23K 1/18
(52) U.S. Cl. ........................ 111/200; 111/900; 426/805
(58) Field of Search ............................... 111/200, 900, 111/905, 906, 913; 426/805

(56) References Cited

U.S. PATENT DOCUMENTS 5,672,354 A * 9/1997 Blumberg .................. 424/410

OTHER PUBLICATIONS

Wendee Holtcamp, Selected Clips, The Rainforest at Warrawee, WildBird Magazine, pp. 1–5 May 1997.*
The Seed Factory: Wild Birdseed Catalog, pp. 1–11 Feb. 1998.*
Forest Preserve District of Cook County (Illinois), Nature Bulletin No. 35 p. 1 Oct. 1945.*
Model for the Dispersal of Seeds by Animals, DeAngelis et al., p. 1 Jul. 1997.*
Importance of pirmary and secondary seed dispersal in the malagasy tree *Commiphora guillaumini*, Bohning–Gaese et al., pp. 1–14 Apr. 1999.*
Food perference of the frugivorous birds in a fragment of semideciduous forest, Sao Paulo, Brazil, Hasui et al., absrtact May 1998.*
Thicket formation in abandoned fruit orchards: Processes and implications for the conservation of semi–dry grasslands in Central Germany, Milton et al., abstract Dec. 1977.*
Avian dispersal and reproductive success of two species of Ligustrum (Oleaceae) in a subtropical forest relict in Argentina, Catedra et al., abstract Dec. 1993.*
Establishment of Woody Plants in Mediterranean Old Fields Opportunity In Space and Time, Debussche et al., abstract Dec. 1992.*
Response to Bird Ingestion, Barnea et al., abstract Dec. 1990.*
Ornithochory of Cereus–Peruvianus Cactaceae In The Serra So Japi State Of Sao Paulo Brazil, Silva, abstract Dec. 1998.*
Patterns of Ornithochorous Development Of Distribution Areas Shown By Examples Of The Genus Rubus L. Rosaceae In Europe, Weber, abstract Dec. 1987.*
Dispersal Of Ornithochorous Seeds From Forest Edges In Central Florida USA, McClanahan et al., abstract Dec. 1987.*
Biology Second Edition, Karen Arms et al., pp. 768 & 769 Dec. 1982.*
The New Encyclopaedia Britannica, vol. 26, pp. 632 & 633 Apr. 1994.*
Botany 231 Lecture Topics, Topic 29, p. 1 Mar. 1996.*
Keystone Species & Guilds, printed pp. 1–6 Aug. 1997.*
Conserving Plant Diversity In Glacier, Glacier National Park Biodiversity Paper #6, Karen J. Schmidt, pp. 1–8 Jun. 1999.*

* cited by examiner

*Primary Examiner*—Victor Batson
(74) *Attorney, Agent, or Firm*—Ryan Kromholz & Manion, S.C.

(57) ABSTRACT

A birdseed mixture and method of reestablishing native wildflowers, woodland plants, and native shrubs within a predetermined geographical region by mixing a predetermined blend of seeds such that the mix of seeds is ingested by birds and other native animals and thereby spread across a region when deposited through the animal's excrement.

2 Claims, No Drawings

BIRDSEED MIXTURE AND METHOD FOR PROPAGATING NATIVE WILD FLOWERS

This is a continuation-in-part application of application Ser. No. 08/791,822 filed Jan. 30, 1997, now abandoned.

BACKGROUND OF THE INVENTION

The present invention relates to a mixture of birdseed for reestablishing native wildflowers, woodland plants, and native shrubs within a predetermined geographical region. Heavy clear-cutting of small plants and trees around an area that has undergone commercial or private development can often destroy the natural foliage of that geographic region. This occurs when the natural planting cycles of the plants indigenous to that region are interrupted or altered. As well, the planting balance of large geographic regions can be over taken by aggressive plants which may have grown significantly due to a one-time environmental change, such as an extremely dry or extremely wet season.

Presently, most planned replanting methods involve manually spreading a desired native seed or desired seed over the ground surface of a specific area or burying seeds below the ground surface. In addition to human accomplished replanting methods, reestablishment may also occur on its own. The natural reproduction cycle of most plants is through some type of mobile seed. Depending upon the plant type, this mobile seed is most often carried or transported by a naturally occurring method so that the otherwise immobile plant species has a way of extending its territory and increasing its chances of survival. Several well known methods of this in nature are: 1) the pollination of flowering plants by active bees and other insects, 2) the taking and burying of acorn seeds by small animals, 3) various methods of wind carried seeds, and 4) the eating of seeds by animals which then deposit the seeds in their excrement across a potentially large region.

By comparison, only one tenth of one percent of all prairies that existed in the United States in 1840 still exist today. Accordingly, there are few prairie plants still in existence even capable of producing seeds for reestablishment of prairie land. It must further be considered that in nature there is known to be a low percent of seed germination from a seed produced by a prior plant. Alternatively, there is a high germination rate for seeds deposited by other means, including animals and birds.

All seeds have a dormancy period which is triggered by a variety of conditions. The dormancy period of a seed is intended to act as a natural mechanism to assure that the conditions which will make successful germination of that seed viable exist prior to germination. For many seeds, this relates to temperature and moisture levels. For some more unique seeds, germination is triggered by such extremes as a fire or long periods of freezing temperatures. Respectively, these requirements provide an environment in which excess foliage has been eliminated from competing for nutrients and sun, and second, an environment in which sufficient seasonal changes have occurred to provide a fertile spring or summer growing season. Still other seeds require the strong amino and other acids that exist in the digestive tracts of most animals to germinate. This germination requirement insures that the seed has, at least to some degree, migrated from its point of origin.

The present invention, a composition of digestible seeds, utilizes this digestive germination requirement to spread the seeds of specific plants across a determined region. To do this, the present invention comprises blending a birdseed mixture that contains a predetermined amount of viable native wildflower, woodland plant, and native shrub seed; along with a predetermined amount of traditional birdseed, which are digested through the bird's digestive system.

SUMMARY OF THE INVENTION

Presently, birdseed is sold in a variety of seed mixtures. These mixtures include a variety of seeds that are naturally appealing and beneficial to birds and their normal diets. As with all animals, birds digest all of the seeds they consume and extract nutrition from the seeds. The remaining seed portions are excreted as part of the bird's excrement. As the excrement and the soil upon which the excrement is deposited act as nutrients and fertilizer, the excreted seeds will germinate and the specific plants that the respective excreted seeds produce will be established where the excrement lands.

The present invention comprises a seed mixture utilized for the reestablishment of native wildflowers, woodland plants and native shrubs. The seeds are mixed with a predetermined amount of birdseed mixture. The consumed seed mixture is then carried by the bird from the bird's location of feeding to where ever the bird happens to excrete the seed. Thus the bird acts as a carrier or disbursement mechanism for propagating the plants which germinate from the non-digestable seeds. In my preferred embodiment, the reestablishment seeds include both wild flowers and grasses. The wild flowers and grasses are specifically selected for the region in which the birds habituate so that native plants are propagated.

The seed mixture and method can also be used in a region where in a native flower or grass has become extinct. By mixing the extinct plant and grass seeds with the known birdseed, the extinct plants can be re-established in the selected region.

Accordingly, the present invention may be summarized as including: A native plant reestablishing birdseed mixture, the bird seed mixture includes 1600 parts by weight basic bird seed, one fourth part by weight native wildflower seed, and one part by weight native grass seed.

The bird seed mixture may be more specifically described as a native wildflower seed mixture including seed selected from the group consisting of Columbine, Butterfly weed, Heath Aster, New England Aster, Lanceleaf Coreopsis, Pale Purple Coneflower, Purple Coneflower, Flowering Spurge, Sawtooth Sunflower, Downy Sunflower, Western Sunflower, Woodland Sunflower, Ox-Eye Sunflower, Roundedheaded Bushclover, Praire Blazingstar, Dense Blazingstar, Bergamot, Dotted Mint, Wild Quinine, Purple Prairie Clover, Yellow Coneflower, Black-Eyed Susan, Sweet Black-Eyed Susan, Sweet Scented Goldenrod, Ohio Goldenrod, Showy Goldenrod, Ironweed, Culver's Root, and Golden Alexanders.

Alternatively, the bird seed mixture may also be composed of native grass seed selected from the group consisting of Big Bluestem, Sideoats Grama, Switchgrass, Little Bluestem, Indiangrass, and Praire Dropseed.

Additionally the bird seed mixture may be composed of the combination of the native wild flower seed and the native grass seed as both are described above.

Further the present invention may include native plant reestablishing birdseed mixture which includes: 100 pounds by weight of basic bird seed, one ounce by weight of native wildflower seed, and four ounces by weight of native grass seed.

Also, the present invention may alternatively be described as a native plant reestablishing birdseed mixture including:

35 parts by weight of Oil Sunflower seed, 35 parts by weight Striped Sunflower seed, 10 parts by weight White Millet seed, 2 parts by weight Mandill Peanuts seed, 10 parts by weight Cracked Corn seed, one part by weight Oyster Shell seeds, one part by weight Peanut Hearts seeds, and 6 parts by weight Safflower seeds.

Finally, the present invention may alternatively be summarized as a method or process for reestablishing plant species. The process is performed by mixing a predetermined amount of bird seed with a predetermined amount of native plant see. The native plant seed may be one single type of seed, a plurality of different seed, or mixture of native wildflower and native grass seeds. The resulting seed mixture or at least a portion thereof may be placed at a predetermined bird feeding location to allow at least one bird to eat at lease some of the seed mixture. Whereby at least some of the native plant seeds are subsequently distributed.

DETAILED DESCRIPTION

Although the disclosure hereof is detailed and exact to enable those skilled in the art to practice the invention, the specific methods herein disclosed merely exemplify the invention which may be embodied in other specific structure. While the preferred embodiment has been described, the details may be changed without departing from the invention, which is defined by the claims.

The present invention comprises a mixture of seeds that contain a predetermined amount of geographically viable native wildflower, woodland plant, and native shrub seed along with a predetermined amount of traditional birdseed. It is important to note that those native wildflower, woodland plant and native shrub seeds that have been destroyed by man are not readily available in nature because these types of plants are rare or limited in nature. If the desired seeds were made available by nature on a regular basis, the need for the present invention would be greatly diminished. By predetermining the type of plants to be reestablished within a region, a specific blend of seeds is incorporated into a complete seed blend and made directly available for birds to consume. By doing so, it is possible to create a naturally planted environment that will re-establish a group of plants back into a predetermined region where these plants previously flourished.

The specific mixture of seeds is formulated to cultivate the desired results. This formulation depends directly upon the desired plant growth, various geographical regions, soil conditions, climate, and the species of desirable native plants indigenous to the region which produce seed that the native birds find palatable. In addition, the seed mixtures account for any additional germination requirements the seeds may have. Below is a non-limiting example for the Midwest region of the United States; considered the states of Wisconsin, Minnesota, Michigan, Iowa, Illinois, Indiana, Missouri, and Ohio.

EXAMPLE

Basic Birdseed Mixture by Weight:

| | |
|---|---|
| Oil Sunflower | 35% |
| Striped Sunflower | 35% |
| White Millet | 10% |
| Mandill Peanuts | 2% |

-continued

| | |
|---|---|
| Cracked Corn | 10% |
| Oyster Shell | 1% |
| Peanut Hearts | 1% |
| Safflower | 6% |
| | 100% |

To a basic birdseed mixture, a predetermined amount of native wildflower and native grass seed is added. The wildflower seeds include, but are not limited to, Columbine, Butterfly weed, Heath Aster, New England Aster, Lanceleaf Coreopsis, Pale Purple Coneflower, Purple Coneflower, Flowering Spurge, Sawtooth Sunflower, Downy Sunflower, Western Sunflower, Woodland Sunflower, Ox-Eye Sunflower, Roundedheaded Bushclover, Praire Blazingstar, Dense Blazingstar, Bergamot, Dotted Mint, Wild Quinine, Purple Prairie Clover, Yellow Coneflower, Black-Eyed Susan, Sweet Black-Eyed Susan, Sweet Scented Goldenrod, Ohio Goldenrod, Showy Goldenrod, Ironweed, Culver's Root, and Golden Alexanders. The native grasses may include, but are not limited to, Big Bluestem, Sideoats Grama, Switchgrass, Little Bluestem, Indiangrass, and Praire Dropseed.

The wildflower and native grass mixture results in a weighted balance of one ounce wildflower seed per four ounces native grass seed. This final mixture comprises approximately 15,000 viable grass seeds and 10,000 viable wildflower seeds per 100 pounds of birdseed mixture.

In the foregoing example, other seed mixtures can be created to reflect alternate geographical regions as well as naturally and un-naturally created growing environments mentioned above. In the preferred embodiment of my invention, the final mixture will include a minimum of ten forbs and three grasses.

The dispersion of the present invention in climates that experience seasonal changes is not affected by cold weather. Even if a viable seed is dispersed during its dormant period, that seed will lay dormant until the weather conditions warm. At this point the seed, although it may have been inactive for an extended period, will begin to germanate.

While the invention has been described in detail and with references to a specific embodiment thereof, it will be apparent to one skilled in the art that various changes and modifications can be made therein without departing from the spirit and scope thereof. The scope of this invention instead shall be determined from the scope of the following claims, including their equivalents.

What is claimed is:

1. A method of propagating and re-establishing a native plant species comprising:

selecting a predetermined geographic locale for said propagation;

providing a predetermined amount of basic birdseed, said basic birdseed consisting of non-indigenous seed relative to said predetermined geographic locale;

mixing said predetermined amount of basic birdseed with a predetermined amount of native plant seed to form a seed mixture, said native plant seed being obtained from plants indigenous to said predetermined geographic locale;

placing at least a portion of said seed mixture at a predetermined bird feeding location; and allowing at least one bird to eat and digest at least some of the said portion of seed mixture; whereby at least some of said native plant seeds are subsequently distributed to said predetermined geographic locale.

2. A method of propagating and re-establishing a native plant species comprising:

selecting a predetermined geographic locale for said propagation;

providing a predetermined amount of basic birdseed, said basic birdseed consisting of non-indigenous seed relative to said predetermined geographic locale;

mixing said predetermined amount of basic birdseed with a predetermined amount of viable, digestible native plant seed to form a seed mixture, said viable, digestible native plant seed being obtained from plants indigenous to said predetermined geographic locale;

placing at least a portion of said seed mixture at a predetermined bird feeding location;

allowing at least one bird to eat and digest at least some of the said portion of seed mixture to provide an eaten and digested portion; and said eaten and digested portion being disseminated through said at least one bird's digestive system and subsequently distributed to said predetermined geographic locale.

* * * * *